Patented Apr. 22, 1941

2,239,491

UNITED STATES PATENT OFFICE 2,239,491

PENTADIENAL AND PROCESS OF MAKING IT

Richard Kuhn, Heidelberg, Germany, and Colin J. O. R. Morris, London, England, assignors to Winthrop Chemical Company, Inc., New York, N. Y., a corporation of New York No Drawing. Application March 23, 1938, Serial No. 197,612. In Germany March 27, 1937

6 Claims. (Cl. 260—598)

This invention relates to 5(2'methyl-6',6'-dimethyl-cyclohexenyl - 1') - 3 - methyl-2,4-pentadienal and to a process of preparing the same.

5(2'methyl - 6',6'- dimethyl - cyclohexenyl-1') - 3-methyl-2,4-pentadienal is of great interest as an intermediate for the synthesis of vitamin A and vitamin A-like products. Attempts have been made to prepare this product for instance by distillation of barium-4(2'methyl-6',6'-dimethyl-cyclohexenyl -1')-2- methyl -1,3- butadiene-1-carboxylate with barium formate, or by condensation of β-cyclocitral with β-methylcrotonaldehyde. However, the products obtained were not the 5(2'methyl-6',6'-dimethyl-cyclohexenyl-1')-3-methyl-2,4-pentadienal since they did not yield physiologically active products on further condensation as is the case with the 5(2'methyl - 6',6' - dimethyl-cyclohexenyl-1')-3-methyl-2,4-pentadienal obtainable in accordance with the present invention.

The process of manufacture of the present invention consists in transforming 4(2'methyl-6',6'- dimethyl-cyclohexenyl -1')-2- methyl -1,3-butadiene-1-carboxylic acid esters into the corresponding anilides by the action of an aminobenzene-N-magnesium halide in accordance with the methods known per se, converting the anilides into the corresponding imido-halides by the action of a phosphorus halide, replacing in the imido-halides the halogen atom by hydrogen by the action of a chromous compound and splitting up the Schiff's base thus obtained to the 5(2'methyl - 6',6' - dimethyl-cyclohexenyl-1') - 3-methyl-2,4-pentadienal. For the reaction of the 4(2'methyl -6',6'- dimethyl-cyclohexenyl -1')-2-methyl-1,3-butadiene-1-carboxylic acid ester to form the corresponding anilide preferably ortho-substituted aniline-N-magnesium halides, for instance o-toluidine-N-magnesium-iodide, are employed. The imido-halides are best obtained from the anilides by the action of phosphorus pentachloride. For replacing the halogen in the imido-halides by hydrogen advantageously chromous chloride freshly prepared according to von Braun (Ber. der Deutschen Chem. Ges. 67 (1934) 269, 1755) is used. Advantageously the reactions take place with the exclusion of oxygen. A separation of the individual intermediate products is not necessary. The aldehyde may be separated from the reaction mixture in a pure state by means of steam distillation. The reactions proceed according to the following reaction scheme:

R:CH—COO.alkyl→R:CH—CO—NH-aryl→
R:CH—C(halogen):N-aryl→R:CH—CH:N-aryl→
R:CH—CH=O In the formulae R stands for the radical of the formula:

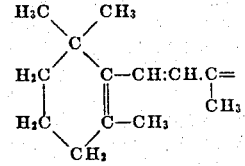

The invention is further illustrated by the following example:

*Example.*—A solution of 32 grams of 4(2'-methyl-6',6'-dimethyl - cyclohexenyl-1') - 2-methyl -1,3- butadiene -1- carboxylic acid ethyl ester in 50 ccs. of ether is added to a solution of ortho-toluidine-N-magnesium-iodide, obtained by the action of a solution of methyl-magnesium iodide (obtained from 5.9 grams of magnesium and 35 grams of methyl iodide in 180 ccs. of ether) upon a solution of 25.5 grams of pure ortho-toluidine in 50 ccs. of ether at 0° C. During the reaction the ether begins to boil. After stirring for a quarter of an hour the mixture is cooled with an ice-common salt mixture and carefully decomposed with 100 ccs. of $$\frac{N}{10}$$

ice cold hydrochloric acid. The ether layer is then washed with ice cold hydrochloric acid until the aqueous layer commences to show an acid reaction to Congo red. The mixture is then repeatedly washed with water, then with $$\frac{N}{20}$$

sodium carbonate solution and finally again with water. The ethereal solution is dried in a nitrogen atmosphere over sodium sulfate. On careful evaporation of the ether the ortho-toluidide remains as a viscous yellowish oil which solidifies at −40° C. to crystals.

21 grams of the ortho-toluidide are mixed with 13.6 grams of phosphorus pentachloride in 50 ccs. of dry benzene at 0° C. The benzene is evaporated in vacuo in a nitrogen atmosphere. The mixture is then distilled twice with benzene under the same conditions. The remaining deep red-brown imidochloride is dissolved in 30 ccs. of dry ether and the solution added drop by drop to a chromous chloride suspension in a nitrogen atmosphere with vigorous stirring. The chromous chloride suspension is obtained by acting upon 59 grams of chromous acetate (containing water of crystallization) with 19 grams of hydrogen chloride in 250 ccs. of dry ether in a nitrogen atmosphere and with vigorous stirring. The reaction mixture becomes warm with dark coloration of the precipitate. After stirring for one hour and a half, the whole mixture is dissolved. It is repeatedly shaken with water, the ether evaporated under reduced pressure in a nitrogen atmosphere, the crude aldehyde remaining in the form of a dark brown oil is covered with 100 ccs. of a 10% oxalic acid solution and the mixture is subjected to steam distillation in a carbon dioxide atmosphere. The colorless distillate is extracted with ether and the ethereal solution dried with sodium sulfate in a nitrogen atmosphere. After distilling off the ether the 5(2'methyl-6',6'-dimethyl-cyclohexenyl-1')-3-methyl-2,4-pentadienal is obtained as a weakly yellowish liquid of terpene-like odor. The aldehyde distils at 110° C. of the heating bath substantially undecomposed under strongly diminished pressure ($10^{-4}$ mm.). It reduces ammoniacal silver salt solution on gentle heating and renders fuchsin-sulfurous acid red. With antimony trichloride in chloroform solution a red brown precipitate is obtained. The semi-carbazone forms when recrystallized from toluene fine needles melting at 193–195° C. (short thermometer).

We claim:

1. The process which comprises reacting upon a 4(2'methyl-6',6'-dimethyl-cyclohexenyl-1')-2-methyl-1,3-butadiene-1-carboxylic acid ester with an aminobenzene-N-magnesium-halide, converting the 4(2'methyl-6',6'-dimethyl-cyclohexenyl-1')-2- methyl -1,3- butadiene - 1 - carboxylic acid anilide formed into the corresponding imidochloride by the action of phosphorus pentachloride, replacing in the imidochloride the chlorine atom by hydrogen by the action of chromous chloride and saponifying the Schiff base thus obtained to the 5(2'methyl-6',6'-dimethyl-cyclohexenyl-1')-3-methyl-2,4-pentadienal.

2. The process which comprises reacting upon a 4(2'methyl-6',6'-dimethyl-cyclohexenyl-1')-2-methyl-1,3-butadiene-1-carboxylic acid ester with o-toluidine-N-magnesium-iodide, converting the 4(2'methyl -6',6'- dimethyl-cyclohexenyl -1')-2-methyl-1,3-butadiene-1-carboxylic acid toluidide formed into the corresponding imidochloride by the action of phosphorus pentachloride, replacing in the imidochloride the chlorine atom by hydrogen by the action of chromous chloride and saponifying the Schiff base thus obtained to the 5(2'methyl -6',6'- dimethyl-cyclohexenyl -1')-3-methyl-2,4-pentadienal.

3. The process which comprises reacting upon a 4(2'methyl-6',6'-dimethyl-cyclohexenyl-1')-2-methyl-1,3-butadiene-1-carboxylic acid ester with o-toluidine-N-magnesium-iodide, converting the 4(2'methyl -6',6'- dimethyl-cyclohexenyl -1')-2-methyl-1,3-butadiene-1-carboxylic acid toluidide formed into the corresponding imidochloride by the action of phosphorus pentachloride, replacing in the imidochloride the halogen atom by hydrogen by the action of freshly prepared chromous chloride and saponifying the Schiff base thus obtained to the 5(2'methyl-6',6'-dimethyl-cyclohexenyl-1')-3-methyl-2,4-pentadienal.

4. The process which comprises reacting upon a 4(2'methyl-6',6'-dimethyl-cyclohexenyl-1')-2-methyl-1,3-butadiene-1-carboxylic acid ester with an aminobenzene-N-magnesium-halide, converting the 4(2'methyl-6',6'-dimethyl-cyclohexenyl-1')-2- methyl -1,3- butadiene - 1 - carboxylic acid anilide formed into the corresponding imidochloride by the action of phosphorus pentachloride, replacing in the imidochloride the chlorine atom by hydrogen by the action of freshly prepared chromous chloride and saponifying the Schiff base thus obtained to the 5(2'methyl-6',6'-dimethyl-cyclohexenyl -1')-3- methyl -2,4- pentadienal.

5. The process which comprises reacting upon a 4(2'methyl-6',6'-dimethyl-cyclohexenyl-1')-2-methyl-1,3-butadiene-1-carboxylic acid ester with o-toluidine-N-magnesium-iodide, converting the 4(2'methyl -6',6'- dimethyl-cyclohexenyl -1')-2-methyl-1,3-butadiene-1-carboxylic acid toluidide formed into the corresponding imidochloride by the action of phosphorus pentachloride, replacing in the imidochloride the chlorine atom by hydrogen by the action of freshly prepared chromous chloride and saponifying the Schiff base thus obtained to the 5(2'methyl-6',6'-dimethyl-cyclohexenyl-1')-3-methyl-2,4-pentadienal.

6. 5(2'methyl - 6',6'- dimethyl - cyclohexenyl-1')-3-methyl-2,4-pentadienal, which is a weakly yellowish liquid of terpene-like odor, distils at 110° C. (temp. of the heating bath) under $10^{-4}$ mm. pressure substantially undecomposed, reduces ammoniacal silver salt solution on gentle heating, renders fuchsin-sulfurous acid red, yields a red brown precipitate with antimony trichloride in chloroform solution and forms a semicarbazone which when recrystallized from toluene is obtained in fine needles melting at 193–195° C.

RICHARD KUHN.
COLIN J. O. R. MORRIS.